No. 625,673. Patented May 23, 1899.
E. HÄRTING.
BICYCLE PACKAGE CARRIER.
(Application filed Dec. 29, 1897.)
(No Model.)
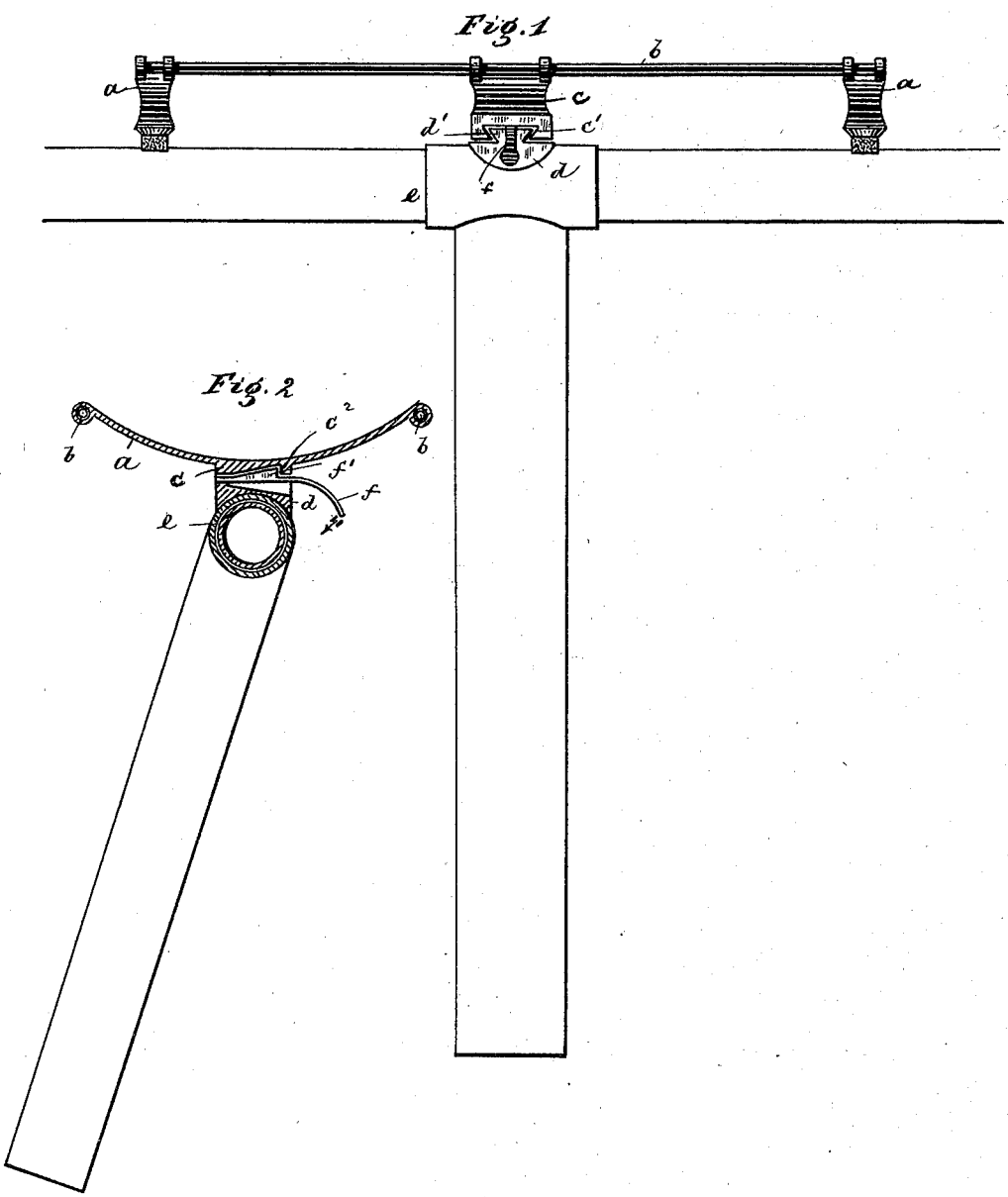

UNITED STATES PATENT OFFICE.

EDUARD HÄRTING, OF MUNICH, GERMANY.

BICYCLE PACKAGE-CARRIER.

SPECIFICATION forming part of Letters Patent No. 625,673, dated May 23, 1899.

Application filed December 29, 1897. Serial No. 664,386. (No model.)

*To all whom it may concern:*

Be it known that I, EDUARD HÄRTING, a citizen of Germany, and a resident of Munich, Bavaria, Germany, have invented certain new and useful Improvements in Bicycle Package-Carriers, of which the following is a specification.

This invention relates to a bicycle package-carrier which is so constructed that the carrier, together with the package, may be removed from the bicycle in a quick and simple manner.

In the accompanying drawings, Figure 1 is a front view of my improved package-carrier, and Fig. 2 a cross-section through the same.

The package-carrier consists, essentially, of cross-pieces $a$, connected to the longitudinal bar $b$ and together constituting a frame to which the package is adapted to be attached. From this frame depends a central plate or arm $c$, having within its bottom a dovetail groove $c'$. This groove is engaged by a dovetail tongue $d'$, formed on a plate $d$, projecting upwardly from the handle-bar $e$. In order to lock the tongue within the groove, I provide a spring-catch $f$, which is attached to the plate $d$ and engages with its nose $f'$ a notch $c^2$ of plate $c$.

To disengage the package-carrier from the bicycle, the spring-catch is depressed, when the carrier, together with the package, may be readily slid off the plate $d$.

What I claim is—

The combination in a bicycle having a handle-bar with a dovetailed tongue projecting therefrom, a package-carrier having a depending grooved plate adapted to engage said tongue, and means for locking the tongue within the grooved plate, substantially as specified.

Signed at Munich, Bavaria, this 9th day of December, A. D. 1897.

EDUARD HÄRTING.

Witnesses:
RAIMUND MAYER,
JOACHIM KREIM.